E. L. J. SCHAFFELKE.
NUT LOCKING DEVICE.
APPLICATION FILED NOV. 18, 1909.

975,642.

Patented Nov. 15, 1910.

WITNESSES:

INVENTOR:
Ernst Luis Johann Schaffelke.

UNITED STATES PATENT OFFICE.

ERNST LUIS JOHANN SCHAFFELKE, OF STOLP, GERMANY.

NUT-LOCKING DEVICE.

975,642.  Specification of Letters Patent.  Patented Nov. 15, 1910.

Application filed November 18, 1909. Serial No. 528,745.

*To all whom it may concern:*

Be it known that I, ERNST LUIS JOHANN SCHAFFELKE, a subject of the Emperor of Germany, residing at Stolp, in Pomerania, in the German Empire, have invented certain new and useful Improvements in Nut-Locking Devices, of which the following is a specification.

In machines and other structures where bolts and nuts are employed for the connection of the different parts, it is frequently necessary also to employ nut locks in that otherwise, through the vibration to which the structure is exposed, the nuts might get loose and serious consequences ensue.

My invention relates to a nut lock of the kind in which the locking is effected by means of a plate having key-hole apertures and in which the nuts are provided with angular necks. According to the invention the locking is effected by means of two plates, one being channeled and having apertures adapted to receive the angular necks of the nuts so as to lock the latter, the bolts being screwed into the nuts. The key-holed plate is adapted to lock the bolts after they have been tightened and is for that purpose slidably mounted in the channel of the other plate so as to allow of being put into engagement with an angular portion on the bolts. The lock-plate is fastened by means of a threaded bolt passing through the channeled plate and fitted on the outside with a nut.

Figure 1:
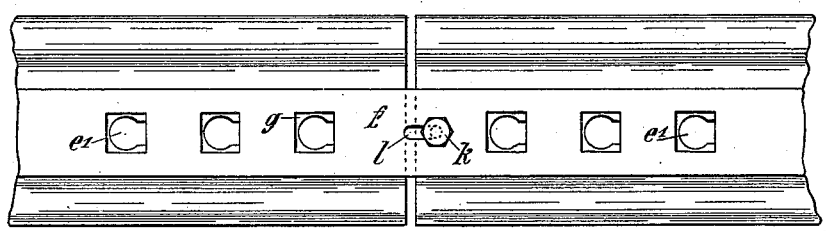
Figure 2:
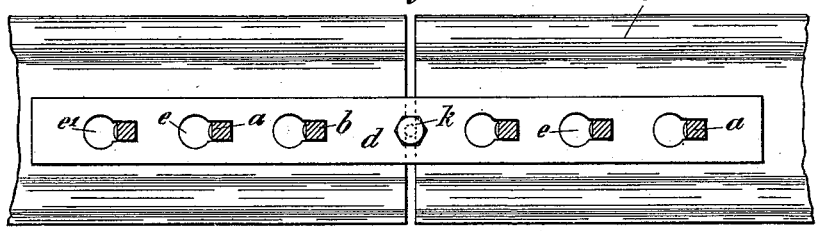
Figure 3:
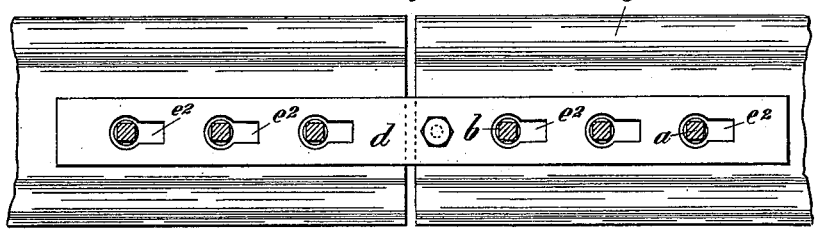
Figure 4:
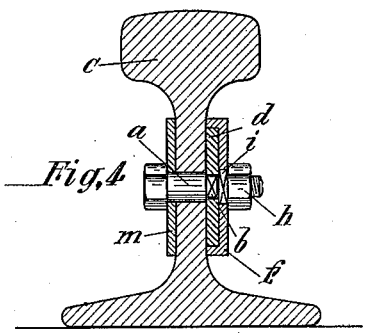
Figure 5:
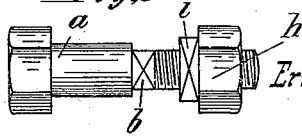

The invention is illustrated by way of example in the accompanying drawing where the device is shown as employed in the connection of rails, Figure 1 representing a side view of the rail and of the lock plate for the nuts, Fig. 2, a similar view showing the lock plate for the bolts, the latter being shown in section and in locked position, Fig. 3, the same view as Fig. 2 with the bolts in unlocked position, and Fig. 4, a cross-section of the rail and the nut locking device. Fig. 5 is a view of the bolt and the nut on an enlarged scale.

The screw thread of the bolt $a$ is immediately followed by an angular portion $b$ which, when the bolt has been passed through the elements it is to connect (in this case the fish plate $m$ and the rail $c$), projects out of the latter together with the screw thread. On the projecting parts of the bolts a plate $d$ is in the first place arranged. This plate has key-hole apertures $e$, of which the circular portions $e^1$ allow the bolts to turn freely, whereas the square portions $e^2$ are adapted, upon the lateral adjustment of the plate, to engage the angular portions $b$ of the bolts, thereby locking the latter.

Next the plate $d$, a plate $f$ is applied to the rail which plate is channeled so as to embrace the plate $d$ and so as to allow a displacement of the latter also when pressed with its flanges against the rail $c$. The plate $f$ is provided with square apertures $g$ in which the nuts, having corresponding projections, are adapted to be locked. The plate $d$ has also a screw-threaded bolt which is guided in a slot $l$ in the plate $f$. By means of a nut $k$, fitted on said bolt, the plate $d$ can be secured in locking and unlocking position.

When tightening the fish plate $m$ to the rail $c$ by means of the bolts $a$, the plate $d$ must have the position relative to the bolts as shown in Fig. 3. The nuts are then adjusted in the apertures $g$ of the plate $f$ whereupon the tightening is effected by screwing the bolts into the nuts. After the tightening, the plate $d$ is moved into the position shown in Fig. 2 and secured in such position by means of the nut $k$. The bolts are now locked by the plate $d$ and the nuts by the plate $f$, and spontaneous movement of both elements is prevented.

Though described in combination with a rail, the device may be used in all kinds of screw connections.

I claim:—

A nut lock of the character described, comprising nuts having square projections, a channeled plate having apertures adapted to receive said projections so as to lock the nuts, screw-threaded bolts having an angular portion next to the screw-thread and being adapted to be screwed into the locked nuts, a plate mounted in the channel of said aforementioned plate so as to allow of being moved after the screw has been tightened and having key-hole apertures for the bolts allowing the latter to turn in one position of the plate and locking them in another position of the same through engagement with their angular portion, and a screw-threaded bolt on the latter plate projecting through a slot in the former for locking the plates together.

ERNST LUIS JOHANN SCHAFFELKE.

Witnesses:
 WILHELM MAIER,
 BENNO BOETTCHER.